(12) United States Patent
Fan

(10) Patent No.: US 7,120,948 B1
(45) Date of Patent: Oct. 17, 2006

(54) ATTACHMENT FOR A SHOWERHEAD TO REDIRECT WATER FLOW

(75) Inventor: Chen-Yueh Fan, Taipei (TW)

(73) Assignee: Winner Double-H Co., Ltd., Taipei (TW)

( * ) Notice: Subject to any disclaimer, the term of this patent is extended or adjusted under 35 U.S.C. 154(b) by 0 days.

(21) Appl. No.: 11/125,958

(22) Filed: May 9, 2005

(51) Int. Cl.
*A47K 3/22* (2006.01)
*A47K 3/34* (2006.01)
*A47K 3/36* (2006.01)

(52) U.S. Cl. .......................................... 4/615
(58) Field of Classification Search ................ 4/559, 4/567, 568, 570, 605, 615; 239/315, 318, 239/442, 444, 447
See application file for complete search history.

(56) References Cited

U.S. PATENT DOCUMENTS 6,618,872 B1 *  9/2003  Fan ............................. 4/615

6,859,955 B1 *  3/2005  Hudson ......................... 4/615

* cited by examiner

Primary Examiner—Tuan Nguyen
(74) Attorney, Agent, or Firm—patenttm.us; James H. Walters

(57) ABSTRACT

An attachment for a shower head having a water outlet extending from a wall includes a three-way pipe having an input engageable with the outlet, a first output, a second output for engagement with the shower head, a communicating sleeve received in the first output of the three-way pipe, an activating rod movably received in the communicating sleeve to selectively block the communication between the first channel and the second channel of the three-way pipe and an activating device selectively engaging the activating rod to move the activating rod from a first position to a second position so as to alternately communicate the input with the first output of the three-way pipe to allow water from the input to flow to the activating device.

19 Claims, 8 Drawing Sheets

ATTACHMENT FOR A SHOWERHEAD TO REDIRECT WATER FLOW

BACKGROUND OF THE INVENTION

1. Field of the Invention

The present invention relates to an attachment for a shower head, and more particularly to an attachment for a shower head to redirect water flow so that the water flow originally flowing to the shower head is able to be redirected for other purposes.

2. Description of Related Art

Normally, a shower head is fixed to the wall in the shower room. People coming to the shower room have only one goal, to shower. However, if the user wants to wash something that is not suitable to be washed outdoors, the user will have to move the object to the bathroom and then prepare a long hose connecting to the faucet for washing the object. That is, the user is not able to use the shower head to achieve other purposes other than showering.

With reference to FIG. 8, a conventional shower head (81) is securely connected to a pipe (80) which is firmly extended from a wall such that the user is able to stand below the shower head (81) to take a shower. However, it will be a waste of the shower head (81) if the conventional shower head (81) can only provide one function.

To overcome the shortcomings, the present invention tends to provide an improved attachment for the shower head to mitigate the aforementioned problems.

SUMMARY OF THE INVENTION

The primary objective of the present invention is to provide an attachment for a shower head to redirect water flow originally flowing to the shower head for other purposes.

In one aspect of the present invention, the attachment of the present invention includes a three-way pipe sandwiched between the shower head and a water outlet and having an input, a first output and a second output, an activating rod movably received in the first output of the three-way pipe to selectively open a channel between the input and the first output so that water flow flowing from the input to the second output is redirected to flow to the first output and thus the user is able to use the redirected water for other purposes.

In yet another aspect of the present invention, the attachment of the present invention has a driving rod selectively connected to the activating rod to force the activating rod to move so that when the driving rod is applied to engage with the activating rod, the input is communicated with the first output and the water flow is redirected.

A further aspect of the present invention is that a recoil mechanism is provided to the attachment so that when the driving rod is moved away from engagement, the recoil mechanism is able to provide a recovery force to the activating rod to close the communication between the input and the first output and open the communication between the input and the second output.

Other objects, advantages and novel features of the invention will become more apparent from the following detailed description when taken in conjunction with the accompanying drawings.

DETAILED DESCRIPTION OF THE PREFERRED EMBODIMENT

Figure 1:
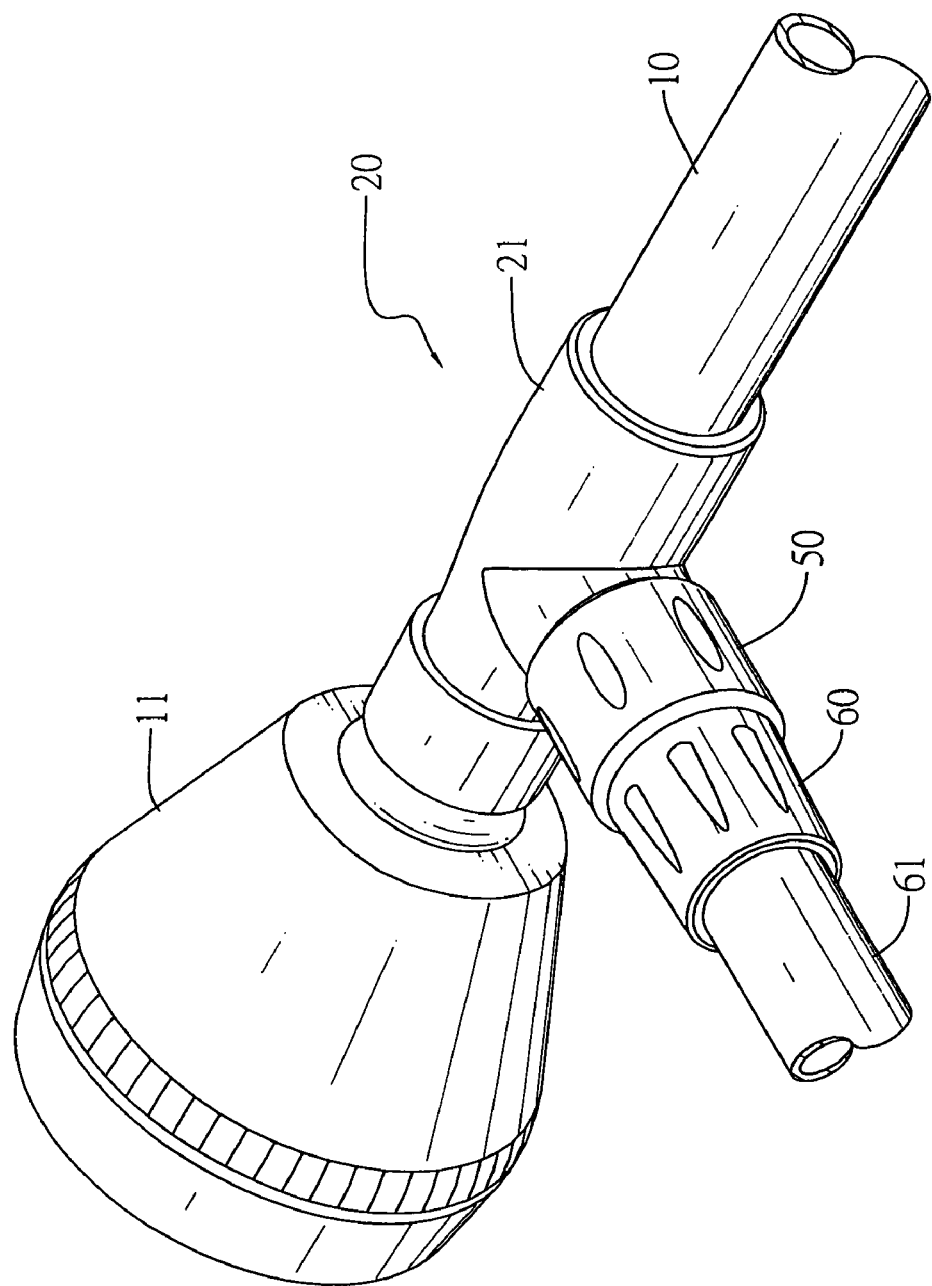
FIG. 1 is a perspective view of the attachment used in a shower head.
Figure 2:
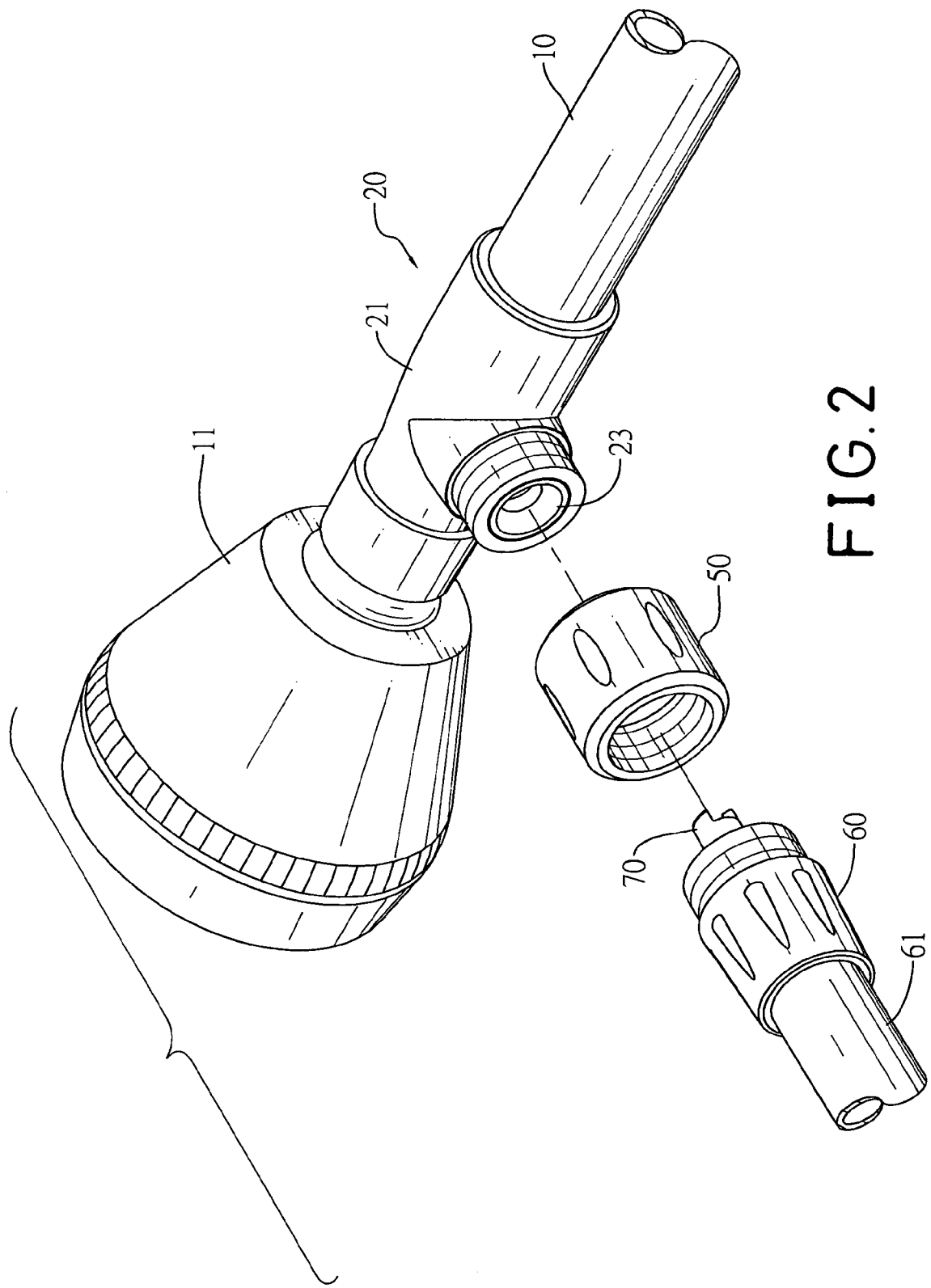
FIG. 2 is an exploded perspective view showing the connection between the attachment and the shower head.
Figure 3:
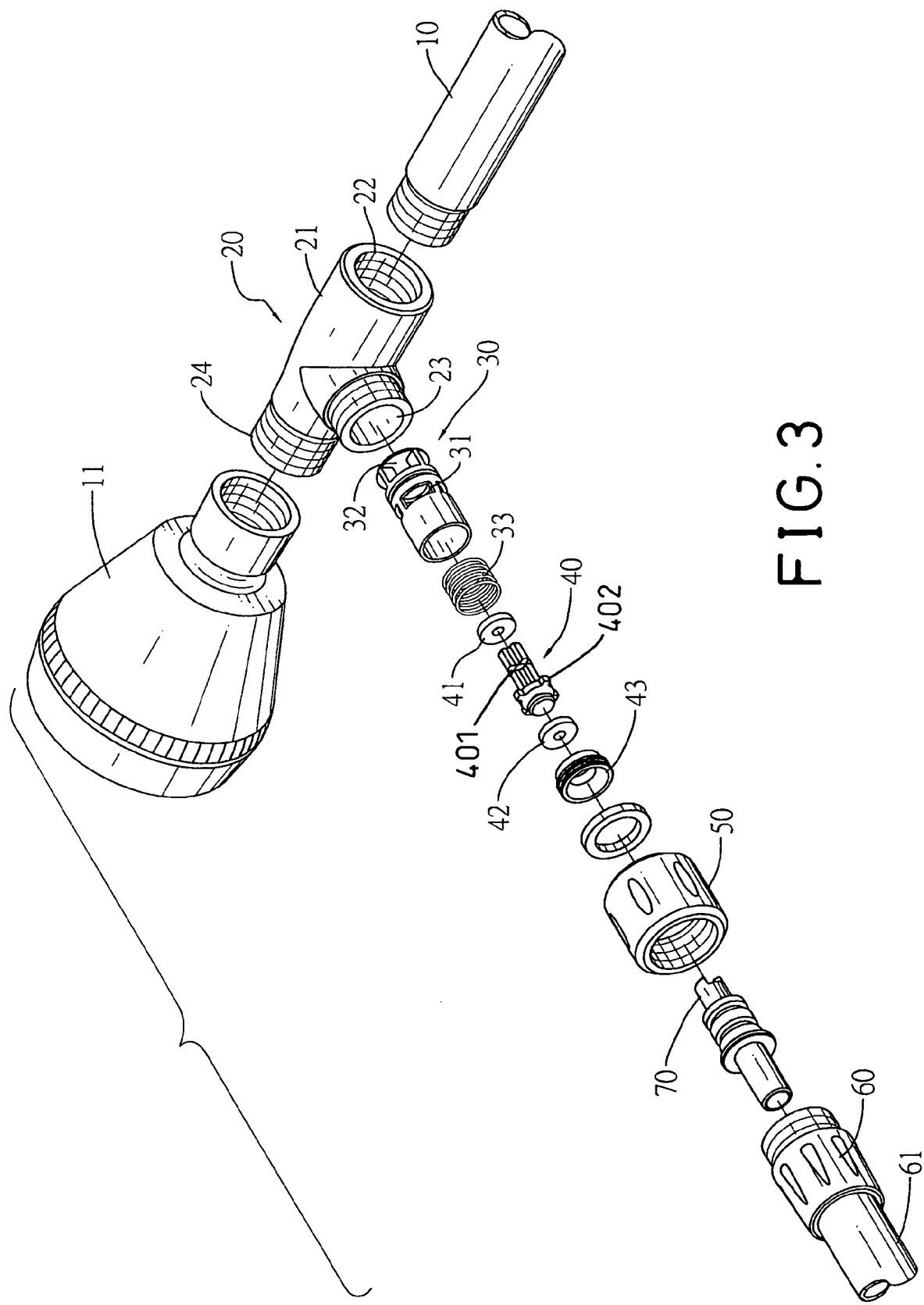
FIG. 3 is an exploded perspective view of the attachment in relative to the shower head.

With reference to FIGS. 1, 2 and 3, it is noted that the attachment constructed in accordance with the present invention is used between a water outlet (10) securely connected to a wall (not shown) and a shower head (11) and includes a three-way pipe (20), a connecting collar (50) threadingly connected to a first output (23) and an engaging stub (60) having a hollow driving rod (70) extending out of the engaging stub (60) and an auxiliary tube (61) oppositely extending in relation to the driving rod (70). The three-way pipe (20) has a body (21), an input (22) engageable with the water outlet (10), a first output (23) communicating with the input (22) and a second output (24) communicating with the input (22) for engagement with the shower head (11).

Inside the connecting collar (50), a communicating sleeve (30) and an activating rod (40) are provided. The communicating sleeve (30) is hollow and has two open ends respectively defined in two opposed tips thereof. The communicating sleeve (30) further has first openings (31) defined in a mediate portion of the communicating sleeve (30) and second openings (32) defined in a front portion of the communicating sleeve (30). The activating rod (40) is movably received in the communicating sleeve (30) and composed of multiple ribs combined together and divergently extending outward such that multiple slits are defined between adjacent ribs of the activating rod (40). The activating rod (40) further has a fixing recess (401) axially defined in an outer periphery of the activating rod (40) to receive therein a first annular seal (41), a stop (402) formed on a distal end portion of the activating rod (40) so as to abut a second annular seal (42) after the activating rod (40) is extended through the second annular seal (42). A conical plug (43) is provided to securely surround a peripheral edge of the communicating sleeve (30) to selectively engage with an outer periphery of the second annular seal (42).

Figure 4:
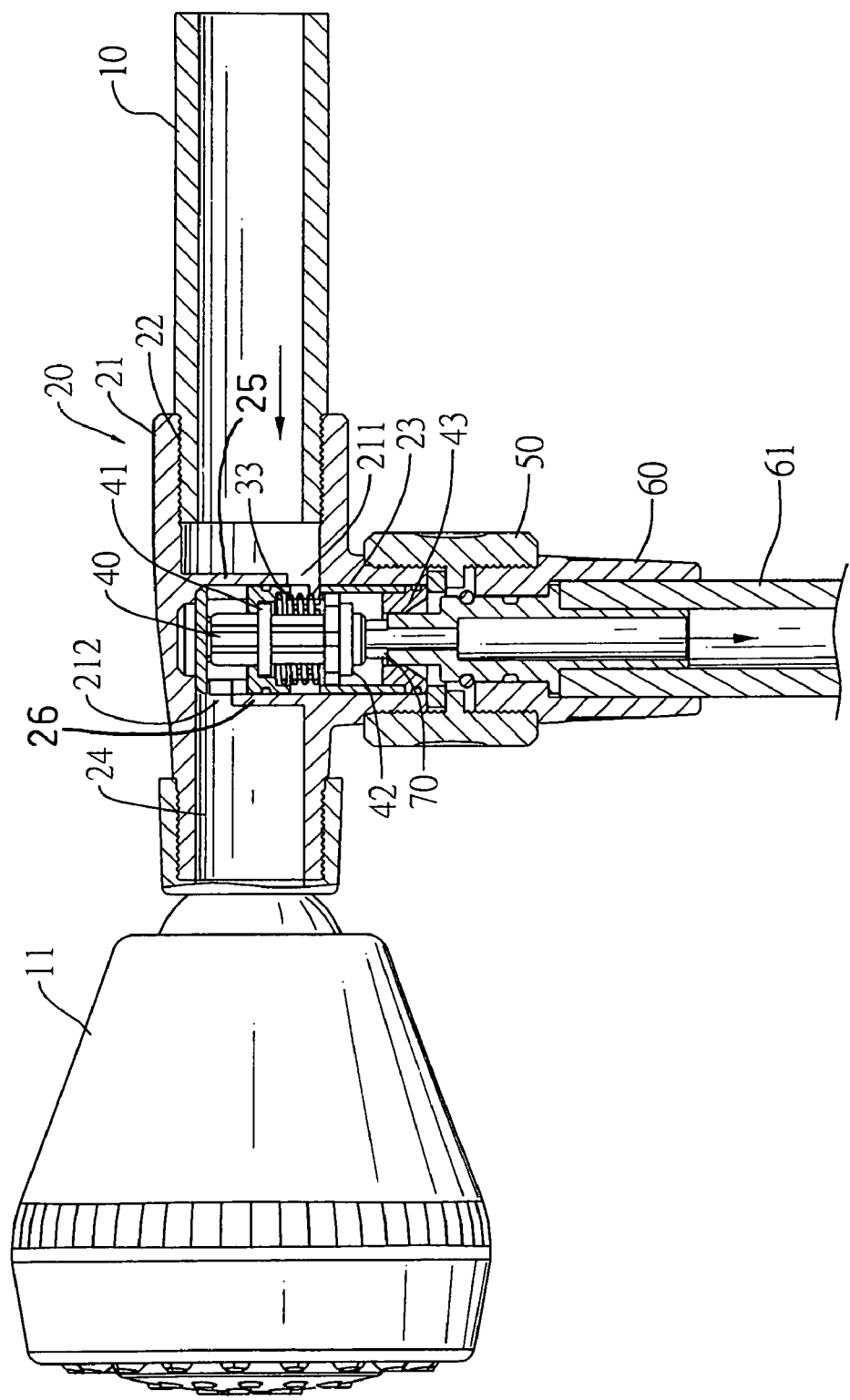
FIG. 4 is a cross sectional view showing that water is redirected to flow from the input to the first output.
Figure 6:
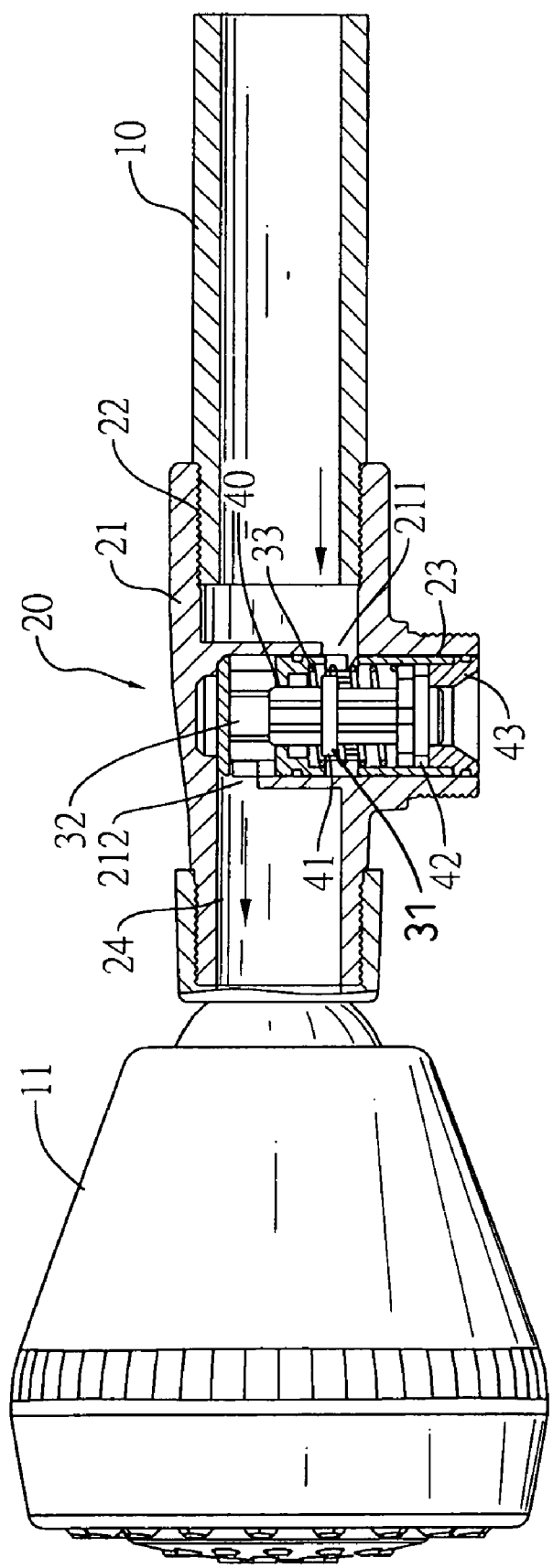
FIG. 6 is a cross sectional view showing that water is flowing from the input to the second output.

With reference to FIGS. 4 and 6, it is noted that the three-way pipe (20) further has a first baffle (25) and a second baffle (26) formed on an inner face of the three-way pipe (20). The first baffle (25) is formed in such a manner that the input (22) is communicated with the first output (23) via a first channel (211) and the second baffle (26) is so formed that the first output (23) is communicated with the second output (24) via a second channel (212). That is, from the depiction of FIG. 4, the first baffle (25) is extending downward from an internal top face of the three-way pipe (20), which results in that the first channel (211) is defined in a lower portion inside the three-way pipe (20). Also, the second baffle (26) is extending upward from a lower portion of the three-way pipe (20), which results in that the second channel (212) is defined in an upper portion of the three-way pipe (20).

Again, when the attachment of the present invention is assembled, the input (22) is connected to the tube (10), the second output (24) is connected to the shower head (11) and the connecting collar (50) is connected to the first output (23). Furthermore, the communicating sleeve (30) is received in the first output (23) with the second openings (32) in communication with the input (22) and the second output (24) and the first openings (31) in communication with the first output (23). Preferably, a recoil spring (33) is received in the communicating sleeve (30) and mounted around the activating rod (40) which has the first annular seal (41) securely received in the fixing recess (401) and the second annular seal (42) abutted to the stop (402). Again, because the conical plug (43) is mounted on the peripheral edge of the communicating sleeve (30), a bottom opening of the communicating sleeve (30) is thus tapered, i.e. a tapered bottom opening (301). A distal end of the recoil spring (33) is abutted to a periphery of the stop (402) and a proximate end of the recoil spring (33) is abutted to a periphery defining a top opening of the communicating sleeve (30).

Figure 5:
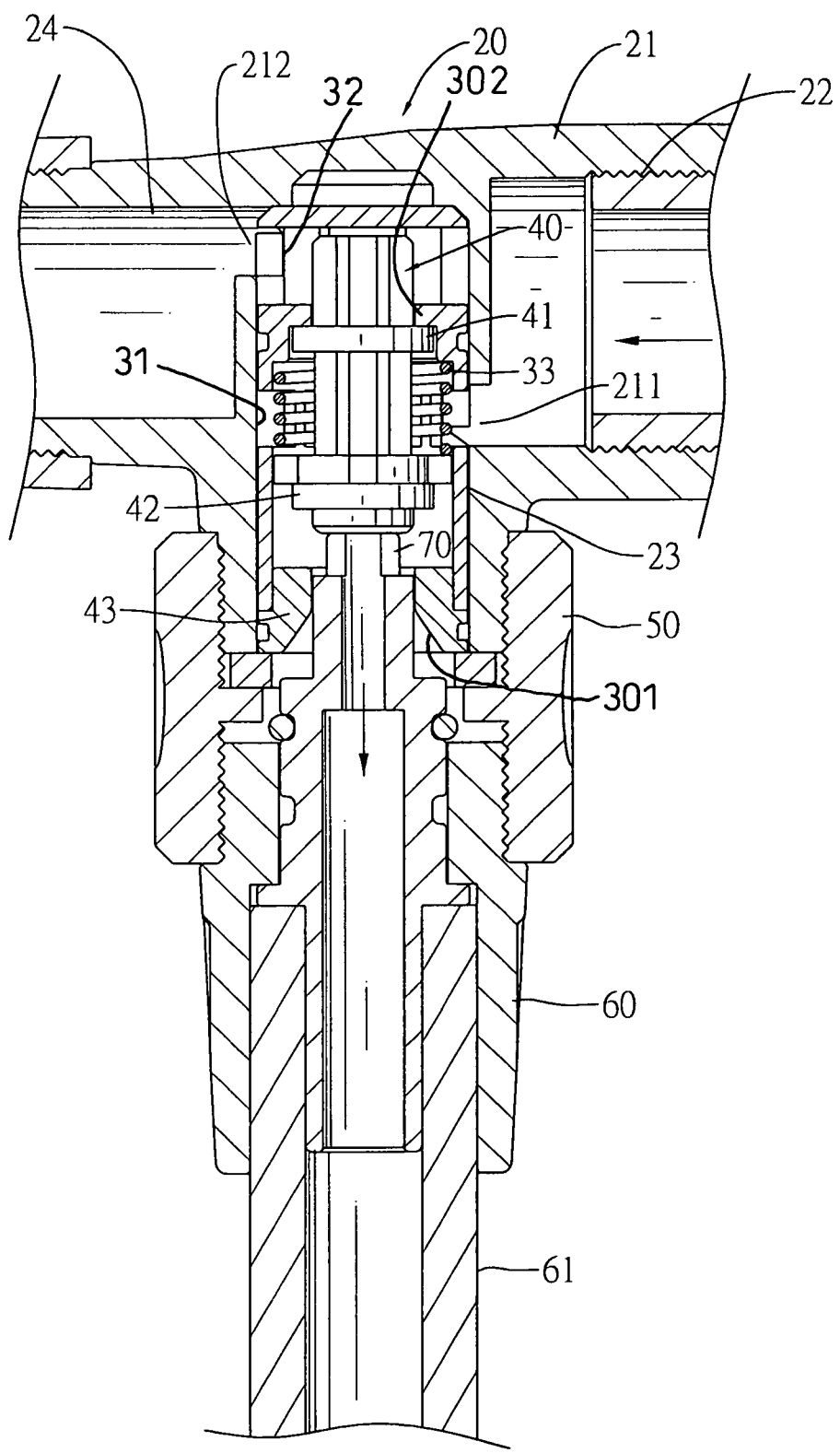
FIG. 5 is an enlarged cross sectional view showing water flowing from the input to the first output.

Referring to FIG. 3, it is noted that a distal end of the engaging stub (60) is provided with an outer threading (not numbered) and a proximate end of the connecting collar (50) is provided with an inner threading corresponding to the outer threading of the engaging stub (60) such that the engaging stub (60) is able to threadingly connect to the connecting collar (50). Again, as shown in FIGS. 4 and 5, it is to be noted that after the engaging stub (60) is threadingly connected to the connecting collar (50), the driving rod (70) is extended through the tapered bottom opening (301) of the communicating sleeve (30) to abut a bottom end of the activating rod (40) so that the activating rod (40) is pushed to compress the recoil spring (33). Before the driving rod (70) is pushed to move the activating rod (40), the second annular seal (42) is received in the tapered bottom opening (301) of the communicating sleeve (30) so that the communication from the first output (23) to the auxiliary tube (61) is blocked. However, after the driving rod (70) is engaged with the activating rod (40) and the activating rod (40) is pushed to compress the recoil spring (33), the second annular seal (42) leaves the tapered bottom opening (301) such that the first output (23) is able to communicate with the auxiliary tube (61). Meanwhile, the first annular seal (41) is moved upward to block a reduced top opening (302) of the communicating sleeve (30) to block the communication between the input (22) and the second output (24). That is, the communication between the first channel (211) and the second channel (212) is blocked by the first annular seal (41) positioned at the reduced top opening (302). Thereafter, the water flow coming from the outlet (10) is redirected to flow from the input (22) to the first output (23) and eventually to the auxiliary tube (61) via the hollow driving rod (70). Thus, the user is able to use the auxiliary tube (61) for other purposes.

Figure 7:
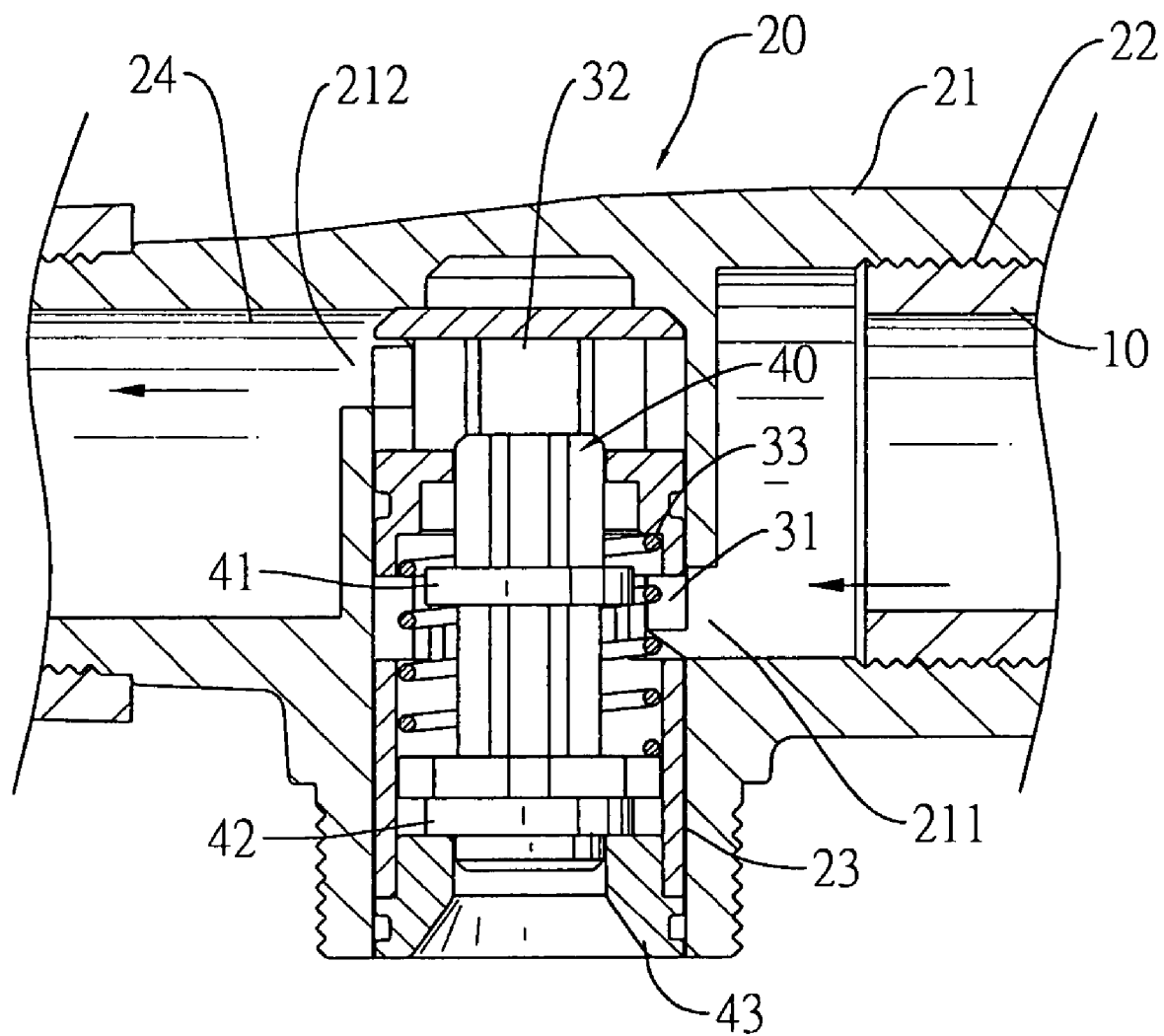
FIG. 7 is an enlarged cross sectional view showing that water is flowing from the input to the second output due to the moving away of the driving rod.
Figure 8:
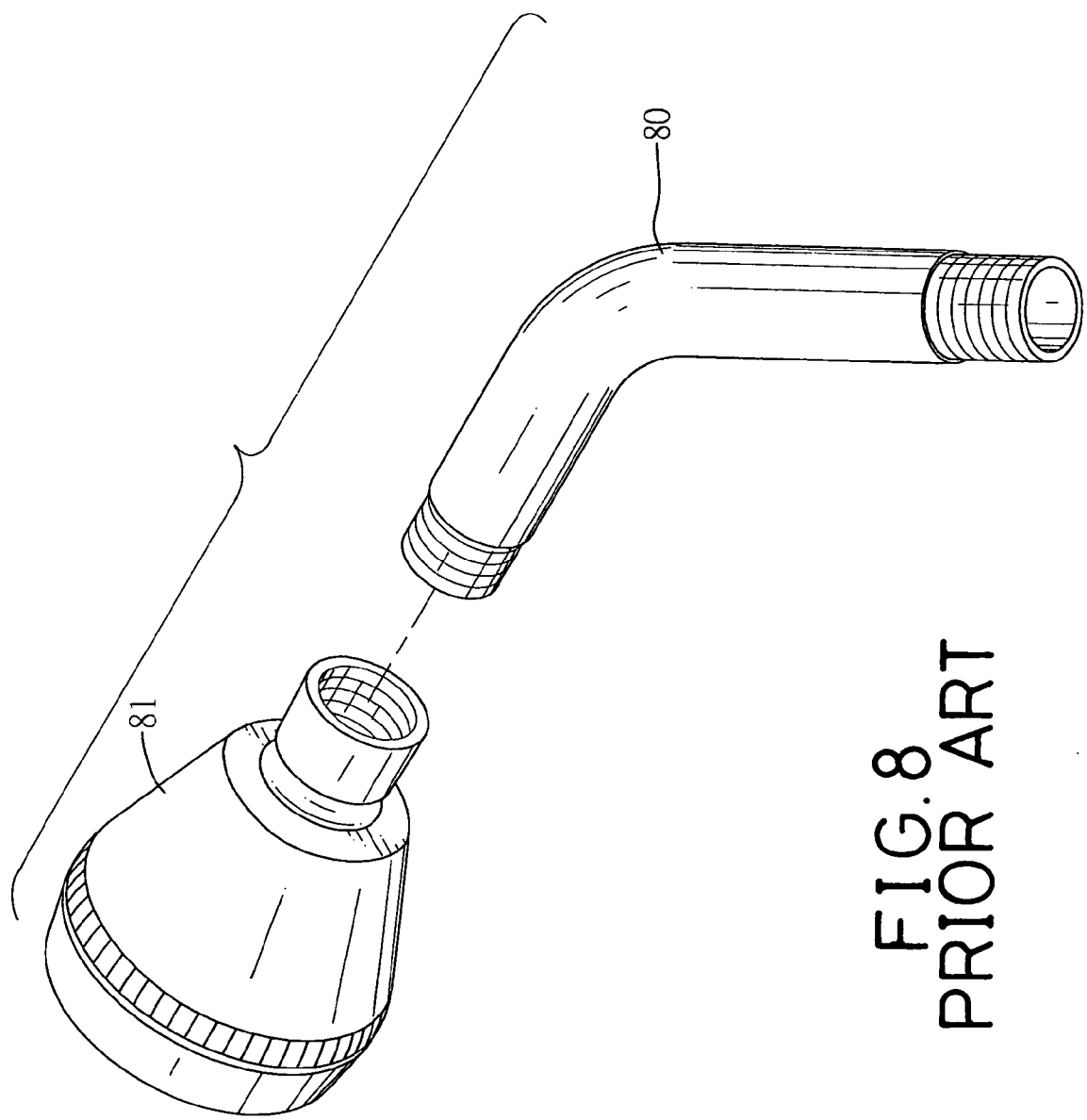
FIG. 8 is an exploded perspective view of a conventional shower head and a pipe firmly connected to a wall.

With reference to FIGS. 6 and 7, when the engaging stub (60) is unscrewed from the connecting collar (50), due to the removal of the driving rod (70), the pushing force to compress the recoil spring (33) is released so that the recoil spring (33) returns to its original position, which exerts a recoil force to push the activating rod (40) to allow the activating rod (40) to return to its original position. After the activating rod (40) has returned to its original position, the first annular seal (41) leaves the reduced top opening (302) to allow the first channel (211) to communicate with the second channel (212) so as to allow the water flow from the outlet (10) to flow to the shower head (11). While the first annular seal (41) leaves the reduced top opening (302), the second annular seal (42) is again inserted into the tapered bottom opening (301) of the communicating sleeve (30) to block the communication between the first output (23) and the auxiliary tube (61) such that water flow from the input (22) is not able to flow to the auxiliary tube (61). Therefore, the user is able to use the shower head (11) for a pleasant shower.

With the installation of the attachment of the present invention, the conventional shower head is thus provided with a new function and the application thereof can be varied.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An attachment for a shower head having a water outlet extending from a wall, the attachment comprising:
    a three-way pipe having an input engageable with the outlet, a first output, a second output for engagement with the shower head, a first baffle defined in an inner periphery of the three-way pipe to define a first channel and a second baffle defined in the inner periphery of the three-way pipe to define a second channel in communication with the first channel, the first baffle extending in a direction opposite to that of the second baffle;
    a communicating sleeve received in the first output of the three-way pipe and having first openings in communication with the first output and second openings in communication with the input and the second output of the three-way pipe, the communicating sleeve further having a reduced top opening and a tapered bottom opening;
    an activating rod movably received in the communicating sleeve to selectively block the communication between the first channel and the second channel; and
    an activating device selectively engaging the activating rod to move the activating rod from a first position to a second position thereby resulting in that when the activating rod is at the first position, the first channel is communicated with the second channel and water flow from the water outlet is able to flow to the shower and when the activating rod is at the second position, the communication between the first channel and the second channel is blocked and the input is communicated with the first output as so to allow water from the input to flow to the activating device.

2. The attachment as claimed in claim 1 further comprising a recoil mechanism received inside the communicating sleeve to provide a recoil force to the activating rod and a connecting stub threadingly connected to the first output.

3. The attachment as claimed in claim 2, wherein the activating rod is composed of multiple ribs combined together and divergently extending outward such that multiple slits are defined in the activating rod to allow water to flow therethrough.

4. The attachment as claimed in claim 3, wherein the recoil mechanism is a recoil spring mounted on the activating rod to provide the recoil force to return the activating rod to the first position from the second position.

5. The attachment as claimed in claim 2, wherein the recoil mechanism is a recoil spring mounted on the activating rod to provide the recoil force to return the activating rod to the first position from the second position.

6. The attachment as claimed in claim 1, wherein the activating device is composed of an engaging collar threadingly connected to a connecting stub which is threadingly connected to the first output of the three-way pipe and a hollow driving rod extending out of the engaging stub to selectively engage with the activating rod.

7. The attachment as claimed in claim 6 further comprising a recoil mechanism received inside the communicating collar to provide a recoil force to the activating rod.

8. The attachment as claimed in claim 7, wherein the activating rod has a first annular seal received in a fixing recess defined in an outer periphery of the activating rod, a stop formed on the outer periphery of the activating rod to abut a second annular seal after the activating rod extended through the second annular seal so that when the activating rod is at the first position, the first annular seal is received in the tapered bottom opening and the water flow from the input is not able to flow to the activating device, and when the activating rod is at the second position, the first annular seal leaves the tapered bottom open to allow the water from the input to flow to the activating device and the second annular seal is received in the reduced top opening of the communicating sleeve to block the communication between the first channel and the second channel such that the water from the input is not able to flow to the second output and to the shower head.

9. The attachment as claimed in claim 8, wherein the activating rod is composed of multiple ribs combined together and divergently extending outward such that multiple slits are defined in the activating rod to allow water to flow therethrough.

10. The attachment as claimed in claim 9, wherein the recoil mechanism is a recoil spring mounted on the activating rod to provide the recoil force to return the activating rod to the first position from the second position.

11. The attachment as claimed in claim 8, wherein the recoil mechanism is a recoil spring mounted on the activating rod to provide the recoil force to return the activating rod to the first position from the second position.

12. The attachment as claimed in claim 7, wherein the activating rod is composed of multiple ribs combined together and divergently extending outward such that multiple slits are defined in the activating rod to allow water to flow therethrough.

13. The attachment as claimed in claim 12, wherein the recoil mechanism is a recoil spring mounted on the activating rod to provide the recoil force to return the activating rod to the first position from the second position.

14. The attachment as claimed in claim 7, wherein the recoil mechanism is a recoil spring mounted on the activating rod to provide the recoil force to return the activating rod to the first position from the second position.

15. The attachment as claimed in claim 6, wherein the activating rod is composed of multiple ribs combined together and divergently extending outward such that multiple slits are defined in the activating rod to allow water to flow therethrough.

16. The attachment as claimed in claim 15, wherein the recoil mechanism is a recoil spring mounted on the activating rod to provide the recoil force to return the activating rod to the first position from the second position.

17. The attachment as claimed in claim 6, wherein the recoil mechanism is a recoil spring mounted on the activating rod to provide the recoil force to return the activating rod to the first position from the second position.

18. The attachment as claimed in claim 1, wherein the activating rod is composed of multiple ribs combined together and divergently extending outward such that multiple slits are defined in the activating rod to allow water to flow therethrough.

19. The attachment as claimed in claim 18, wherein the recoil mechanism is a recoil spring mounted on the activating rod to provide the recoil force to return the activating rod to the first position from the second position.

* * * * *